L. ROSENWALD.
EGG CASE.
APPLICATION FILED JUNE 29, 1914.
1,168,562.
Patented Jan. 18, 1916.
2 SHEETS—SHEET 1.
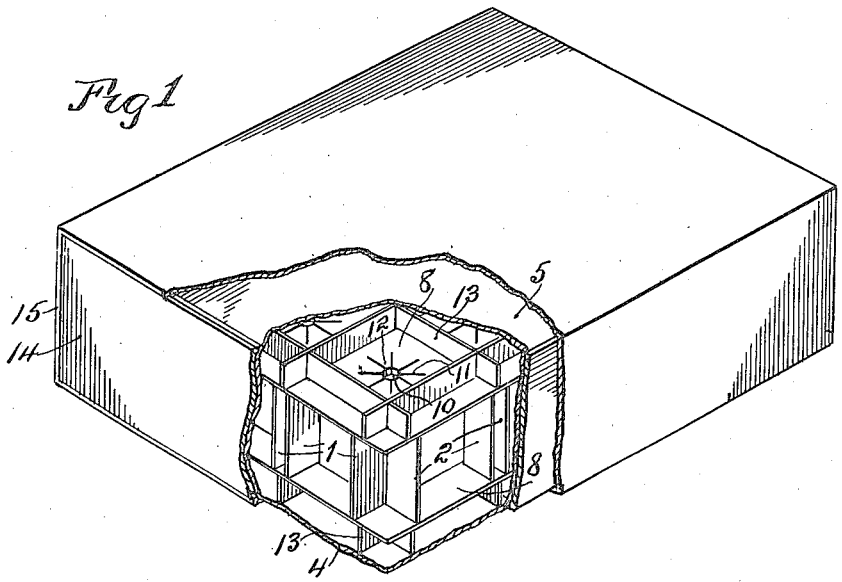
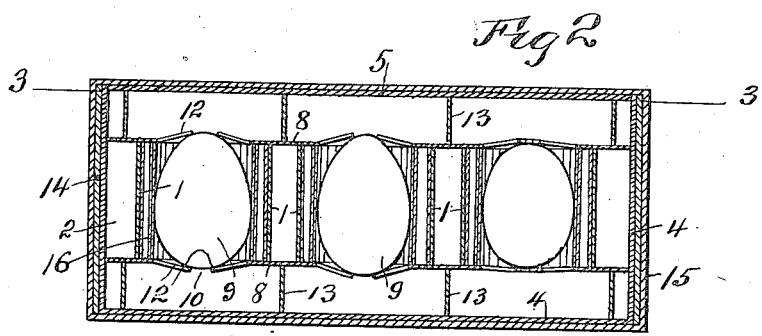
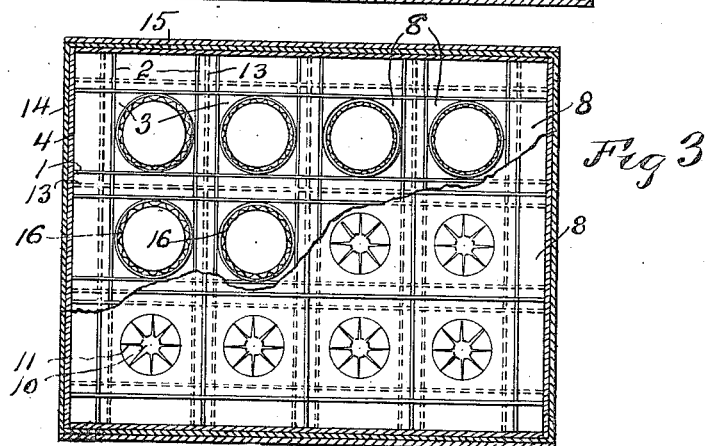
WITNESSES:
R.E. Hamilton
E.B. House.
INVENTOR.
Lucian Rosenwald
BY Warren D. House
His ATTORNEY.

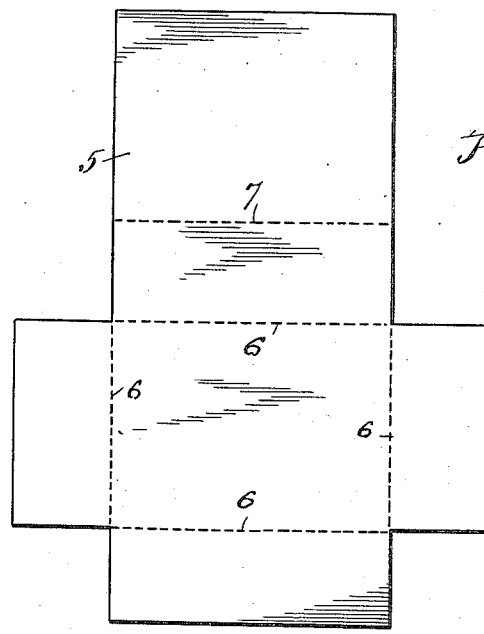
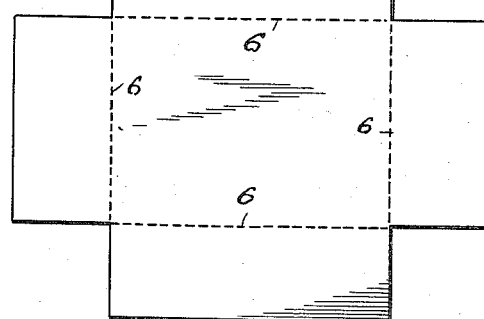
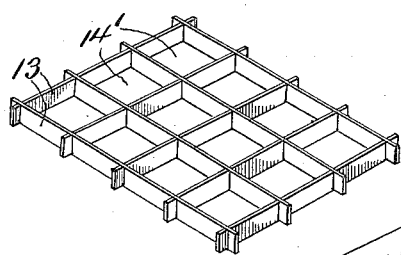
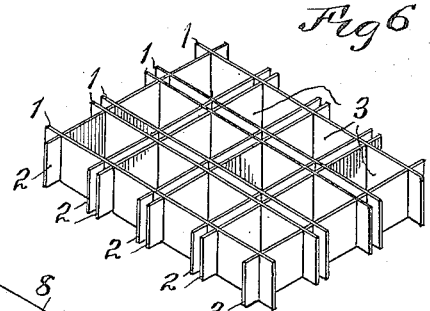
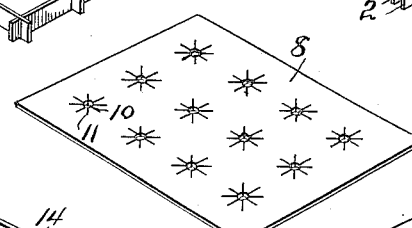
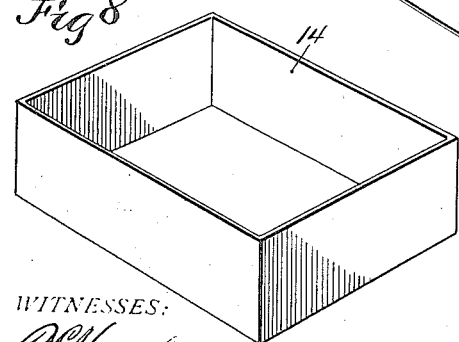

UNITED STATES PATENT OFFICE.

LUCIAN ROSENWALD, OF KANSAS CITY, MISSOURI.

EGG-CASE.

1,168,562.   Specification of Letters Patent.   Patented Jan. 18, 1916.

Application filed June 29, 1914. Serial No. 847,822.

*To all whom it may concern:*

Be it known that I, LUCIAN ROSENWALD, a citizen of the United States, residing at Kansas City, in the county of Jackson and State of Missouri, have invented a certain new and useful Improvement in Egg-Cases, of which the following is a specification.

My invention relates to improvements in egg cases.

The object of my invention is to provide an egg case which is cheap to manufacture, which may be readily packed and unpacked, and with which eggs may be safely shipped by express or parcels post without liability of breakage.

The novel features of my invention are hereinafter fully described and claimed.

In the accompanying drawings, which illustrate the preferred embodiment of my invention, Figure 1 is a perspective view, partly broken away, of my improved egg case assembled for shipment. Fig. 2 is a vertical sectional view of the same, with eggs shown in the holders. Fig. 3 is a horizontal section on the line 3—3 of Fig. 2, some of the parts being broken away. Fig. 4 is a plan view of the blank from which the box is made. Fig. 5 is a perspective view of one of the spacing members. Fig. 6 is a perspective view of the filler. Fig. 7 is a perspective view of one of the flexible sheet members. Fig. 8 is a perspective view of the inner casing. Fig. 9 is a perspective view of the outer casing.

Similar reference characters designate similar parts in the different views.

1 and 2 designate respectively crossed flexible partitions, made preferably of strips of paper slit half way at points of intersection in the usual manner of making fillers for egg cases, the crossed members 1 and 2, which are intermediate of the side and end partitions, are, as best shown in Fig. 6, disposed in pairs, the members of each pair being spaced apart parallel with each other. The partitions 1 and 2 are arranged to form rows of egg cells 3, each cell being separated from each adjoining cell by a pair of said flexible partitions. The ends of the members 1 extend beyond the outer members 2, and the ends of the members 2 extend beyond the outer members 1.

4 designates a box having a cover 5 and adapted to be formed from the cross-shaped blank shown in Fig. 4. Said blank is provided with creasings or scorings 6 along which the blank may be bent to form the sides at right angles to the bottom of the box. One of the portions which is adapted to form one side and the cover 5 is provided with a transverse scoring or creasing 7, Fig. 4, which will form a flexible joint between said cover and the side to which it is attached.

Supporting the filler, comprising the members 1 and 2, is a flat sheet member 8 provided with yielding seats arranged respectively to register with the cells 3 and adapted to respectively receive the lower ends of eggs 9, Fig. 2. Each yielding seat is preferably formed by providing a perforation 10, from which radiate slits 11, thereby providing yielding tongues 12 adapted to support an egg. Supporting the sheet member 8 is a spacing member comprising crossed partitions preferably formed of strips of card board, said partitions forming spaces 14', Fig. 5, which are adapted to respectively register with the cells 3. The spacing member 13 rests upon the bottom of the box 4. Another sheet member 8 constructed exactly like that one already described, rests upon the filler comprising the members 1 and 2, and is also provided with yielding seats, provided with flexible tongues 12 for receiving respectively the upper ends of the eggs 9. Another spacing member 13, exactly like the one already described rests upon the upper sheet member 8, and is adapted to support the cover 5 when the latter is closed.

14 designates a rectangular inner casing which is adapted to receive the box 4, and which is adapted to be slipped into an outer casing 15. The casings 14 and 15 are respectively shown in Figs. 8 and 9.

In the operation of my invention, the blank shown in Fig. 4 is formed into a box, after which the lower spacing member 13, the lower sheet member 8 and the filler are consecutively placed in the box 4 in the order named. If desired, the cells 3 may have respectively placed therein vertical tubular egg holders 16, preferably formed of paper tubes lined with corrugated paper. Eggs are then placed in the holders 16, after which the upper sheet member 8 is placed on top of the eggs, and the upper spacing member 13 is placed on top of said upper sheet member. The cover 5 is then closed against the upper spacing member 13, after which the box 4 is slipped into the inner casing 14, following which said inner casing is slipped into the outer casing 15, at which time the case is ready for storage or shipment. By having flexible seats at the upper and lower ends of the eggs, the case is adapted to firmly hold eggs of different lengths. By having the intermediate flexible partitions 1 and 2 of the filler arranged in pairs, the members each of which are spaced apart and parallel with each other, the eggs are yieldingly held spaced apart from each other.

I do not limit my invention to the structure shown and described, as modifications, within the scope of the appended claims, may be made without departing from the spirit of my invention.

Having thus described my invention, what I claim and desire to secure by Letters Patent is:—

1. An egg case comprising a box, a filler located therein comprising crossed flexible partitions arranged to form egg cells, some of the partitions being disposed in pairs, the members of which are spaced apart parallel with each other, each cell being separated from each adjoining cell by a pair of partitions, vertical tubular egg holders disposed respectively in said cells, a flexible sheet member at one side of said filler and at one set of ends of said cells, and provided with yielding seats adapted to respectively receive the ends of eggs contained in said cells, and a spacing member comprising crossed partitions forming spaces adapted to register with said cells, said spacing member resting against said flexible sheet member.

2. An egg case comprising a box, a filler located therein comprising crossed flexible partitions arranged to form egg cells, some of the partitions being disposed in pairs, the members of which are spaced apart parallel with each other, each cell being separated from each adjoining cell by a pair of said partitions, vertical tubular egg holders disposed respectively in said cells, two flexible sheet members disposed respectively above and below said filler and provided each with yielding seats adapted to respectively receive the ends of eggs contained in said holders, and two spacing members comprising each crossed partitions forming spaces adapted to register with said cells, said spacing members being disposed respectively above and below said sheet members.

In testimony whereof I have signed my name to this specification in presence of two subscribing witnesses.

LUCIAN ROSENWALD.

Witnesses:
WARREN D. HOUSE,
E. B. HOUSE.